(No Model.)

A. S. JACKSON.
Baking Pan.

No. 240,138.  Patented April 12, 1881.

Attest:
R. F. Barnes.

Inventor:
Allen S. Jackson
by Ellis Spear
Atty

United States Patent Office.

ALLEN S. JACKSON, OF KOKOMO, INDIANA.

BAKING-PAN.

SPECIFICATION forming part of Letters Patent No. 240,138, dated April 12, 1881.

Application filed February 23, 1881. (No model.)

*To all whom it may concern:*

Be it known that I, ALLEN S. JACKSON, of Kokomo, county of Howard, and State of Indiana, have invented a new and useful Improvement in Bake-Pans; and I do declare that the following is a full, clear, and exact description of the same.

My invention relates to bake-pans of that class in which smaller pans are united to form one large sectional pan; and it consists in a special construction, hereinafter fully described, whereby a compact, cheap pan may be made of sufficient strength and adapted to bake thoroughly and uniformly.

Figure 1:
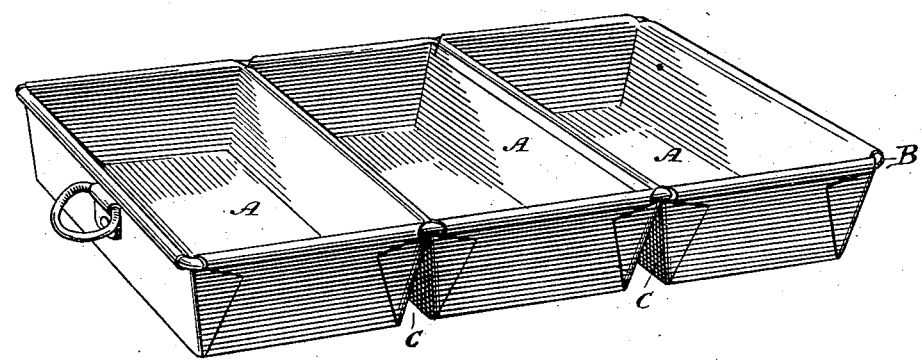
Figure 2:
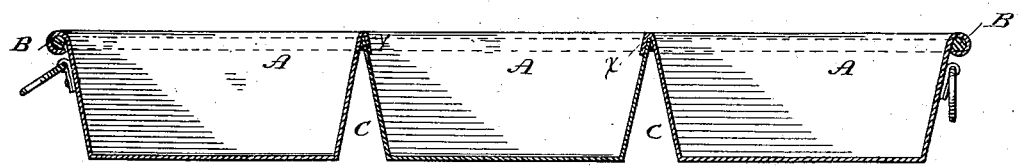

In the accompanying drawings, Figure 1 is a perspective view, and Fig. 2 represents a central longitudinal section.

My improved pan is made of smaller rectangular pans $a\ a\ a$, placed side by side, as shown. The edge of one pan is extended on one side and is turned down, as shown at $x\ x$, forming a flange, which fits over the edge of the adjoining section, whereby the edges of the pan-sections are interlocked and connected without the use of rivets. Further connection of the sections is made by means of an ordinary strengthening-wire common to all the sections running around the whole, and connecting them by turning down edges or flanges in the usual way. This wire is shown at B in both the figures. The pan-sections are made inclined, as shown, which shape leaves V-shaped insterstices between adjacent sections, and allows the heat to act uniformly.

I am aware that bake-pans have been made in sections and connected by rivets, and also by the common stiffening-wire, such being shown in the patent of Milligan, No. 96,605, granted November 9, 1869. I do not claim this combination; but

I claim—

A bake-pan made of rectangular sections, united by interlocking flanges and by the common stiffening-wire, as shown and described.

In testimony whereof I have signed my name to this specification in the presence of two subscribing witnesses.

ALLEN S. JACKSON.

Witnesses:
 J. H. KROH,
 WILLIAM TRUEBLOOD.